United States Patent Office 3,660,329
Patented May 2, 1972

3,660,329
WATER-REDUCIBLE PRINTING INK VEHICLE AND INKS MADE THEREFROM
John L. Wysocki, Hasbrouck Heights, N.J., assignor to Frye Industries Inc., New York, N.Y.
No Drawing. Filed May 7, 1969, Ser. No. 822,712
Int. Cl. C09d 11/10, 11/12
U.S. Cl. 260—22 CQ
4 Claims

ABSTRACT OF THE DISCLOSURE

A water-reducible ink vehicle composition comprising, in its preferred aspect, an alkaline aqueous phase having dissolved therein a cross-linkable water-soluble polyester resin and one or more coupler solvents and further, having dispersed therethrough, finely-divided styrenated shellac and a wax. The ink vehicle composition can be employed per se as an overprint varnish or it can be pigmented with a wide variety of pigments to provide pigmented inks.

---

The present invention is concerned with printing inks and with printing ink vehicles and, more particularly, with water-reducible printing inks suitable for printing by flexographic, rotogravure and roll coating processes.

As a general rule, while water-reducible printing inks and ink vehicles are known and used, they often exhibit two or three deficiencies. As a first point, known water-reducible ink vehicles are not particularly noted for producing glossy finishes. Secondly, prints made from known water-reducible inks are usually sensitive to water unless the prints are heated after being deposited. Thirdly, prints made with known water-reducible inks are not usually resistant to detergents. Another deficiency which often is exhibited by known water-reducible inks is lack of stability both at room temperature and under repetitive freezing-thawing conditions. Each of the foregoing characteristics and others have limited to one degree or another, the practical utility of water-reducible inks known heretofore.

It has now been discovered that by means of a special combination of ingredients, water-reducible inks can now be provided which overcome many, if not all, of the deficiencies exhibited by water-reducible inks known heretofore and which are highly useful in practical printing processes.

It is an object of the present invention to provide novel, highly useful water-reducible ink and ink vehicle compositions.

It is another object of the present invention to provide a novel process for producing said novel ink compositions.

It is a still further object of the present invention to provide a novel printing process employing the novel inks of the present invention.

Other objects and advantages will become apparent from the following description.

Generally speaking, the present invention relates to an ink vehicle composition having an alkaline aqueous phase (1) in which is dissolved a water-soluble resin and coupling solvent or solvents, the character of the water-soluble resin being such that upon evaporation of the solvents, the water-soluble resin will transform into a water-insoluble resin and (2) in which is dispersed a high gloss wax compound and ultra-fine particles of a very hard resin. The ink vehicle composition can be pigmented with a wide variety of pigments by means of a special process which will become apparent in view of the discussion hereinafter.

A typical ink vehicle composition of the present invention contains in terms of percent by weight of the entire vehicle composition approximately 41% solids consisting of about 7.7% water-soluble resin solids, 27.3% of the very hard resin and about 6% of wax compound solids. The remainder of the typical ink vehicle, i.e. about 59%, comprises evaporable liquids of which about 42% is water and 14.5% comprises water miscible alcoholic, glycolic or glycolic ether solvents. It will be appreciated by those skilled in the art that these percentages can be modified within commercially reproducible limits and can be further modified within the scope of the invention to achieve various rheological characteristics desired.

The water-soluble resin employed in the ink vehicles of the present invention advantageously can be a water-soluble polyester resin sold by Spencer Kellogg as a 60% solids solution in a combination of water and coupler solvent under the trade designation XP 1814. The solution has a pH of about 8.5 and contains in addition to the polyester resin a cross-linking agent which is a completely water-soluble alkylated melamine formaldehyde resin. The polyester resin has a molecular weight of about 1000. The coupler solvent referred to in relation to XP 1814 can be a water-miscible alcohol, glycol or glycol ether. Illustrative coupler solvents are ethanol, ethylene glycol, diethylene glycol, methoxydiethylene glycol, ethoxy diethylene glycol, butoxydiethylene glycol and isopropanol. Those skilled in the art will appreciate that other polyester and modified polyester resins can be employed for the purposes of the present invention provided that they contain a sufficient proportion of free carboxylic or hydroxyl groups so as to provide the necessary miscibility with water at a slightly alkaline pH, for example, between 7.5 and 9.5. If such other resins are used, those skilled in the art will appreciate that suitable cross-linking agents such as butylated melamine formaldehyde resin, hexamethoxymethyl melamine, water-soluble urea-, thiourea-, melamine-, phenol- and ammeline-, aldehyde condensation products can be employed as cross-linking agents in order to assist in providing water- and detergent-resistance in the final print. While each resin-cross-linking agent combination has its own practical and stoichiometrical requirements, those skilled in the art will appreciate that, in general, about 1% to about 10% of cross-linking agent based on the weight of the polyester or modified polyester resin is operative for purposes of the present invention. Polyester resins useful in the present invention include resins made by partially esterifying di and tribasic acids with di and poly-functional alcohols to achieve a product having an acid number in the range of about 60 to about 300. Typical polyester resins are made by reacting phthalic anhydride and glycols or glycerol under esterifying conditions. Such resins may be modified with drying oils, rosin acids such as polyacrylic acid, methacrylic acid and the like and other saturated and unsaturated materials.

The very hard resin which is contained in the ink vehicle of the present invention as very finely-divided, dispersed particles is advantageously the solids of a styrenated-shellac emulsion sold under the trade name Synthemul 40-203. This emulsion contains 50% solids of which solid portion about 80% by weight is styrene and 20% is shellac in copolymerized, ultra-high molecular weight (150,000 to 250,000) form. The liquid phase portion of the emulsion is essentially water with a pH of about 7.5 to 9.5 and contains an anionic surface active agent. Those skilled in the art will appreciate that other resins can be employed in place of the styrene-shellac resin. Particularly, at least some, for example up to 25%, of the styrene can be replaced by other ethylenically unsaturated materials which will copolymerize with styrene and shellac in emulsion form. Ethylenically unsaturated materials which can be used in this fashion include vinyl toluene and other substituted, styrene-like materials including, for example, divinyl benzene, p-chlorovinyl benzene and other similar halogenated and alkylated homologues of styrene. In addition, substances such as acrylic acid, methacrylic acid, crotonic acid, maleic acid, fumaric acid, methyl acrylate, ethyl methacrylate, vinyl acetate and other ethylenically unsaturated monomers can substitute for part of the styrene in the high mole weight styrene-shellac copolymer. Advantageously, for use in the inks of the present invention, the high mole weight polymer ingredients are copolymerized in emulsion form under very high shear conditions and in the presence of a surfactant to assure that the ultimate polymer will exist as very finely-divided emulsified particles. It is necessary for operability of the present invention that the high mole weight polymer form a 40% or 50% solids emulsion having leveling and flow characteristics such as those exhibited by the Synthemul 40-203 emulsion at the same solids level.

The high gloss wax compound employed in the process of the present invention can be any extremely finely-divided dispersion of wax in water or an organic liquid miscible with water. Operative waxes include natural waxes such as beeswax, carnauba wax, montan wax and paraffin wax and synthetic waxes such as polyethylene wax. The wax compound can, and advantageously does, contain a resin soluble in the medium in which the wax is dispersed, for example a water or alcohol soluble resin. If the wax is very hard a wax solvent such as heptane, turpentine or the like can be used in small quantities to soften the wax. A formula for a highly satisfactory wax compound is as follows:

| Ingredient: | Parts-by-weight |
|---|---|
| Carnauba wax | 30 |
| Amberol 750 [1] | 25 |
| Heptane | 7 |
| Ethyl alcohol | 38 |

[1] A maleic anhydride resin soluble in alcohol sold by Rohm & Haas. This resin can be replaced by a water soluble polyester resin.

The ingredients of the wax compound are milled together, for example in a Baker-Perkins mixer, until an extremely fine, substantially transparent dispersion is obtained. A very fine wax dispersion is important to the production of an ink vehicle or varnish having a high gloss. If the dispersion is not sufficiently fine, gloss will be detrimentally affected.

Solvents employed in the inks or ink vehicles of the present invention are generally mixtures of water and water-miscible lower alcohols, glycols and glycol ethers. It is important that the pH of the ink vehicle be maintained on the basic side. The optimum pH range for stability is about 8.0 to about 8.6. Ordinarily, in order to achieve this pH range, the ink vehicle contains about 0.5% to about 4% by weight of an alkaline agent. The alkaline agent can be any relatively weak base such as ammonia, morpholine, triethanol amine, dimethyl ethanol amine, sodium carbonate, borax or the like. In terms of advantage both as to price and to volatility, aqueous ammonia is preferred.

In compounding ink vehicles of the present invention, it is generally advantageous to use prepared solutions and emulsions along with additional solvent in mixture. Table I sets forth ranges of ingredients in the ink vehicles (in percent by weight) in terms of prepared solutions and emulsions along with an indication of the percentages of solids involved in the specific ingredients.

TABLE I

| Ingredient | Broad range, percent | Most advantageous range, percent | Percent solids |
|---|---|---|---|
| Polyester solution | 5-20 | 10-15 | 60 |
| Hard resin emulsion | 30-55 | 40-55 | 50 |
| Wax compound | 3-10 | 3-5 | 55 |
| Alkaline agent | 1-4 | 1-2 | |
| Solvent combination | Balance | Balance | |

Table I, particularly the percentages of solids indicated for the polyester solution and hard resin emulsion, shows that the ink vehicles of the present invention contain more solvent than is indicated against "Solvent Combination." Generally, solvents will account for about 50% to 65% of the weight of the ink vehicle.

Inks are made with the ink vehicles as set forth in Table I by grinding up to about 36% by weight, e.g. about 10% to 35% by weight of one or more pigments such as titania; molybdate and valencia orange; chrome, primrose, and benzidine yellows; barium or calcium lithols, Watchung red, Red Lake C, bonadur maroon; rhodamine; clays; ultramarine; cyan, maratex, milori or victoria blue; cyan green; channel and furnace blacks; or fluorescent pigments in the vehicle. It is highly advantageous, however, to grind the pigment in a diluted-down polyester solution first before compounding the remainder of the varnish. Grinding can be successfully accomplished in a sand or shot grinder as well as in a conventional ball mill. By judiciously selecting the amount of diluted-down polyester solution used with the particular pigment, good grinding action can usually be attained with no difficulty. The examples of ink tabulated hereinafter were compounded by grinding about 30 parts-by-weight of the pigment along with 8 parts-by-weight of polyester solution diluted with about 13 parts-by-weight of solvent mixture.

In order to give those skilled in the art a better understanding of the invention, the following examples are given:

EXAMPLE I

A water-reducible varnish was made by mixing 12.82 parts-by-weight of polyester solution XP 1814 with 4.58 parts-by-weight of ethanol, 4.58 parts-by-weight of ethylene glycol monoethyl ether and 10.71 parts-by-weight of water. To the foregoing mixture was added 54.59 parts-by-weight of styrene-shellac polymer emulsion (Synthemul 40-203), 10.99 parts-by-weight of high gloss dispersed wax compound (tabulated hereinbefore) and 1.83 parts-by-weight of aqueous ammonia. The whole was then thoroughly mixed.

The thus produced ink vehicle was employed as an overprint varnish with excellent results. The overprint varnish deposit exhibited high gloss and, even without heating, was resistant to water and detergents.

OTHER EXAMPLES

Table II contains ink compositions made from the ink vehicle of Example I all of which inks were made as described hereinbefore and exhibited high gloss and excellent resistance to water and detergents.

TABLE II

| Example No. | Type of pigment | Percent pigment | Percent vehicle |
|---|---|---|---|
| II | Titania | 21 | 79 |
| III | Mogul Black | 15 | 84 |
| | Victoria Blue | 1 | |
| IV | Calcium Lithol | 26 | 74 |
| V | Fluorescent Pigment [1] | 20 | 80 |
| VI | Red Lake C | 24 | 76 |

[1] Proprietary product produced by Switzer Bros. Inc.

EXAMPLE VII

A varnish similar to that of Example I is made by substituting equal parts-by-weight of an emulsion of an acrylic-modified styrene-shellac polymer for the emulsion of styrene-shellac polymer in Example I.

EXAMPLE VIII

A varnish similar to that of Example I is made by substituting equal parts-by-weight of an aqueous, 60% solids, alkaline solution of an oil-modified polyester resin having an acid number of about 150 and about 4% (based on the weight of the polyester) resin of hexamethoxymethyl melamine for the solution XP 1814 in Example I.

While the present invention has been described in conjunction with advantageous embodiments, those skilled in the art will recognize that modifications and variations may be resorted to without departing from the spirit and scope of the invention. Such modifications and variations are considered to be within the purview and scope of the invention.

I claim:

1. A water-reducible ink vehicle comprising an aqueous alkaline phase having (A) dissolved therein 3% to 12% by weight of said total vehicle of a water-soluble resin capable, on evaporation of said aqueous phase, of becoming water-insoluble and (B) dispersed therethrough and emulsified therein 15% to 27.5% by weight of said total vehicle of a finely-divided high molecular weight resin comprising a copolymer of styrene and shellac having a molecular weight of 150,000 to 250,000 and 1.6% to 5.5% by weight of total vehicle of a highly dispersed wax, the alkali of said phase comprising 1% to 4% by weight of said total vehicle.

2. An ink vehicle as in claim 1 wherein said water-soluble resin is a water-soluble polyester resin associated with a cross-linking agent selected from the group consisting of butylated melamine formaldehyde resin, hexamethoxymethyl melamine and water-soluble urea-, thiourea-, melamine-, phenol- and ammeline-, aldehyde condensation products.

3. An ink vehicle as in claim 1 wherein said aqueous phase contains a member selected from the group consisting of water-miscible alcohols and glycol ethers.

4. An ink vehicle as in claim 1 having up to about 36% pigment dispersed therein.

References Cited

UNITED STATES PATENTS

| | | | |
|---|---|---|---|
| 2,640,782 | 6/1953 | Bloch et al. | 106—28 |
| 2,794,747 | 6/1957 | Bloch | 106—28 |
| 2,890,189 | 6/1959 | Greenlee | 260—29.2 |
| 2,961,420 | 11/1960 | Frey et al. | 260—27 |
| 3,257,344 | 6/1966 | Carlick et al. | 260—21 |

DONALD E. CZAJA, Primary Examiner

R. W. GRIFFIN, Assistant Examiner

U.S. Cl. X.R.

106—29, 30, 31; 260—20, 21, 22 CB, 27 R, 29.2 E, 29.2 R, DIG. 38